Oct. 24, 1967

N. ACKERMAN 3,348,576

FLUID FLOW CONTROL DEVICE AND MECHANISMS EMBODYING THE SAME

Filed April 7, 1964

INVENTOR.
NATHAN ACKERMAN
BY
ATTORNEYS

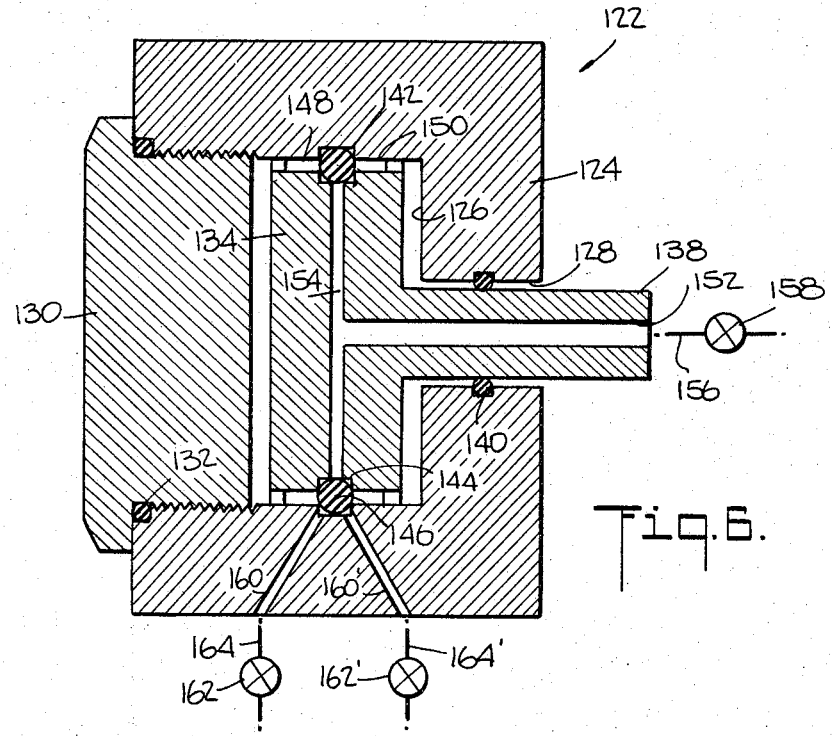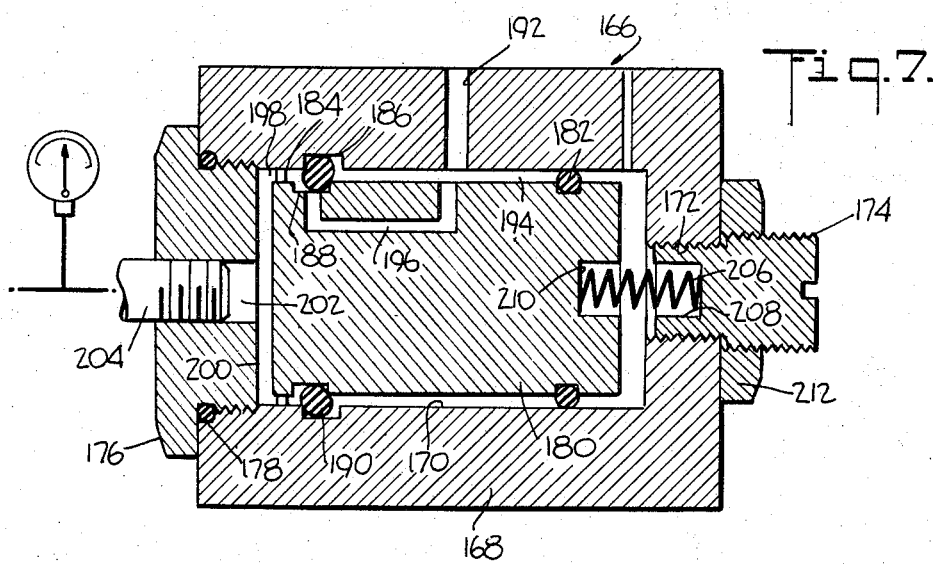

United States Patent Office 3,348,576
Patented Oct. 24, 1967

3,348,576
FLUID FLOW CONTROL DEVICE AND MECHANISMS EMBODYING THE SAME
Nathan Ackerman, Lake Success, N.Y. (% Sandex, Inc., 678 Berriman St., Brooklyn, N.Y. 11208)
Filed Apr. 7, 1964, Ser. No. 358,032
3 Claims. (Cl. 137—625.43)

This invention relates to a fluid flow control device and to mechanisms in which such a device is incorporated.

In the field encompassing the greater number of its uses my invention pertains to a fluid flow control device wherein a first passageway can be selectively and controllably connected to either of two other passageways and preferably in which either of two different first passageways can be selectively and controllably connected to two different other passageways. More particularly, in the aforesaid field my device is arranged to selectively and controllably connect a source of fluid to either of two utilization spaces or to selectively or controllably connect a utilization space to either of two different sources of fluid. The source of fluid may be at superatmospheric, atmospheric or subatmospheric pressure and ordinarily there will be two different sources which are selectively and controllably connected to two different utilization spaces. My invention also may be used in a field where it acts as a flow control device to controllably connect a single first passageway to a single other passageway as, for example, a single source of fluid to a single utilization space or to a manifold.

The first field of use embraces devices and mechanisms such as three-way valves, four-way valves, reciprocating motors and vibrators. The second field of uses typically includes off-and-on through flow valves, variably settable through flow valves and regulators, e.g. pressure regulators.

Heretofore it has been common practice to construct fluid flow control devices which employed at least one sealing element such as an elastomeric member that, for the purpose of selection, control or regulation, was slid across at least one flow opening in a rigid body against which said member was pressed. Usually the elastometric member was in the form of an O-ring. Although such flow control devices were far more compact, lighter, and quicker to operate than their predecessor valves, e.g. gate valves, globe valves, butterfly valves and conical valves that did not use O-rings for control purposes, they had certain drawbacks. Thus, they needed a comparatively long stroke for movement from one extreme position to another, for example a quarter of an inch, this length of stroke being necessary to shift the elastomeric control member wholly across the flow opening. They required a rather considerable minimum force for operation due to the high friction restraint imposed by the pressure of the elastomeric control member against the rigid body. The elastomeric control member tended to be cut and torn due to the crossing thereof under pressure over the flow opening in the rigid body, that is to say, the edges of the opening would chafe, abrade and cut into the elastomeric control member which was necessarily pressed firmly against the body. Furthermore, when the device operated at high pressures, all of the parts had to be hand-fitted so that the device under these circumstances could not be a mass produced device nor could it be a device with freely interchangeable parts.

It is an object of my present invention to provide a fluid flow control device and a mechanism utilizing the same which overcome all the foregoing defects.

More specifically it is an object of my invention to provide a device and mechanism of the character described, i.e. wherein a control member (which may be elastomeric) is used, which are capable of operating with an extremely short minimum stroke, for instance as little as two thousandths of an inch, which do not offer a high frictional resistance to operation, which do not require an elastomeric control member to repeatedly cross a flow opening under pressure and which can be mass produced in an inexpensive manner and with its parts fully interchangeable.

It is another object of my invention to provide a device and mechanism of the character described which constitute relatively few and simple parts that do not have to be finished to extremely high degrees of accuracy.

It is another object of my invention to provide a device and mechanism of the character described which are not unusually sensitive, for efficient operation, to variations in tolerance whereby such a device and mechanism can be made by workers of ordinary skill.

It is another object of my invention to provide a device and mechanism of the character described which are fast, certain and efficient in operation and which will move quickly from one extreme position to another.

It is another object of my invention to provide a device and mechanism of the character described which are more compact, less expensive and lighter than previous devices and mechanisms employing an elastomeric control member.

It is another object of my invention to provide a device and mechanism of the character described which are capable of use under all circumstances and in all kinds of machines, circuits and systems in which devices and mechanisms employing an elastomeric control member heretofore have been employed.

Other objects of my invention in part will be obvious and in part will be pointed out hereinafter.

My invention accordingly consists in the features of construction, combinations of elements and arrangements of parts which will be exemplified in the devices and mechanisms hereinafter described and of which the scope of application will be indicated in the appended claims.

In the accompanying drawings, in which are shown various possible embodiments of my invention, FIG. 1 is an axial sectional view of a basic device constructed in accordance with my invention, i.e. one employing a minimum of parts, said device being embodied in a four-way valve;

FIG. 6 is an axial sectional view through a vibrator motor incorporating a fluid flow control device according to the present invention; and FIG. 7 is an axial sectional view through a pressure regulator incorporating a fluid flow control device according to the present invention.

Figure 1:
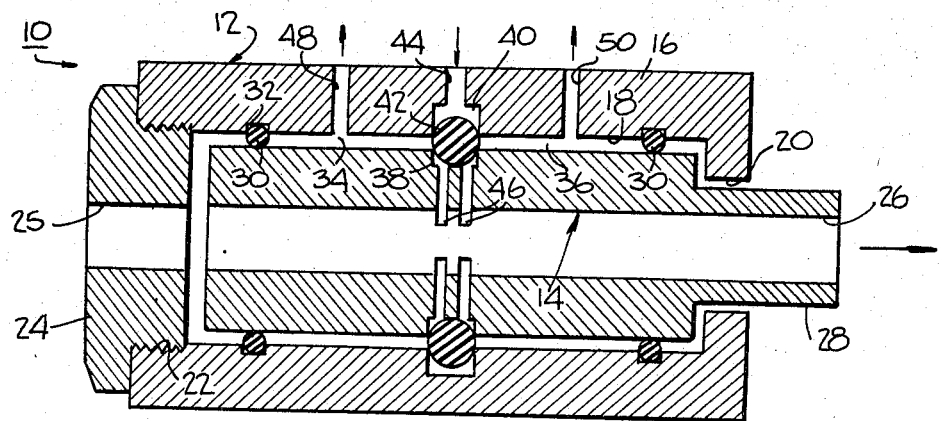

In general I achieve the several objects of my invention by providing two rigid bodies in juxtaposed relatively slidable relationship. Each of these bodies is formed with a groove and the grooves in the two bodies are so mutually situated that they are in opposed parallel relationship. A control member which may be elastomeric is positioned in said grooves so as to bridge the space from the groove in one member to the groove in the other member and said control member, if elastomeric, may be sufficiently large to fill the mouths of at least one or, optionally, both grooves. If the control member is not sufficiently large to fill the mouths of both grooves, it need not be elastomeric.

At least one of the grooves has the space between the control member and mouth of the groove connected to a body flow passageway. Moreover at least one surface flow passageway leads away from one set of sides of the mouths of the grooves in the region where the two bodies are in opposed relationship. With the foregoing construction, when the two grooves are in registered opposition, the control member, if elastomeric, acts as a seal between the two flow passageways. When the bodies are so relatively moved that the groove which is connected to the body flow passageway is shifted toward the surface flow passageway, the control member is squeezed between opposite corners of the two grooves to open a space between the control member and the mouth of the groove having the body flow passageway. This space provides a path for traverse of fluid between the two passageways and does this with only a small movement. If this control member is elastomeric such movement need only be enough to squeeze rather than bodily shift the control member.

In a preferred mode of carrying out my invention which is desirable because of ease of manufacture, the two rigid bodies constitute a cylinder and a piston slidable therein, one of the grooves being on the interior surface of the cylinder and the other on the exterior surface of the piston. Both grooves are annular and in planes transverse to the longitudinal axes of the cylinder and piston or, in other words, transverse to the direction of relative movement of the piston and cylinder. This enables the control member, if elastomeric, to be in the form of the readily and widely available O-ring.

I believe that one of the very widely useful embodiments of my invention will be a four-way valve. In such a valve, body flow passageways will be provided to both grooves and surface flow passageways will be provided which lead away from opposite sides of the mouths of both grooves. Thereby when the piston and cylinder experience relative movement in one direction, one of the body flow passageways will be connected to one of the surface flow passageways and the other body flow passageway will be connected to the other surface flow passageway; thereafter when the piston and cylinder experience relative motion in the opposite direction the said one body flow passageway will be connected to the said other surface flow passageway and the said other body flow passageway will be connected to the said one surface flow passageway. Thus with a comparatively slight movement, for example, in the order of as little as two thousandths of an inch there will be a complete reversal of connections.

Referring now in detail to the drawings, and more particularly to FIGS. 1 through 4, the reference numeral 10 denotes a four-way valve constructed in accordance with and embodying my present invention. Said valve comprises a tubular casing 12, i.e. a cylinder, and a piston 14 slidable therein. Both the cylinder and piston are rigid and to this end can be made from any strong material. Typically they will be fabricated from a metal. However it is within the contemplation of my invention to employ a synthetic plastic, provided the strength of such material is sufficiently great to withstand the pressures that are to be controlled by the valve.

The piston and the cylinder each may be made of as few or as many pieces as is desired and as here illustrated the piston is shown to constitute a single piece and the cylinder two pieces. More particularly, the cylinder is in the form of a tubular sleeve 16 having a bore 18 terminating at one end of the cylinder in a through opening 20 of reduced diameter. The wide other end of the bore is provided with internal threads 22 to receive a matchingly threaded closure plug 24. The plug is provided with a central opening 25, optionally of a size to match a central bore 26 in the piston 14. The piston is sized for slidable reception within the cylinder bore 18 and is formed at one end with a stub shaft 28 which projects through the opening 20 for external control (manual, mechanical or electrical) of the position of the piston 14.

In the form of my invention being described, the external diameter of the piston is sufficiently smaller than the internal diameter of the cylinder to provide a clearance that is sufficiently great to act as a surface flow passageway. This clearance is large enough to permit flow therefrom of the fluid being handled with an acceptable pressure drop. For this purpose the clearance, where compressed air is being handled, can be quite small. For instance it may be as little as 0.001 inch on the radius. This distance provides a substantial flow area, bearing in mind that the clearance is around the entire periphery of the piston.

For this purpose of illustration such clearance has been grossly exaggerated in FIGS. 1 through 4. The length of the piston, exclusive of the shaft 28, is less than the distance between the inner surface of the plug 24 and the inner surface of the end wall of the cylinder through which the opening 20 extends. The difference in length is sufficient to permit the desired amount of axial movement of the piston within the cylinder. This difference in length likewise has been exaggerated in FIG. 1 for the purpose of illustration. The difference in lengths may be greater than the required amount of relative axial movement between the piston and cylinder inasmuch as suitable stop means may be provided on the mechanism for shifting the position of the piston.

I provide two sealing O-rings 30, one adjacent each end of the piston. Each O-ring is seated in an annular groove 32 which, as shown, may be located on the internal surface of the cylinder. Each O-ring is radially compressed between the base of its affiliated groove and the external surface of the piston and will, as is well known, serve to prevent escape of fluid under pressure from the tubular space between the piston and casing to the ambient surroundings. It will be understood, of course, that the annular grooves 32 could be located in the piston in which event the O-rings would press against the surface of the cylinder bore 18.

Attention is directed to the fact that the piston is centralized on the longitudinal axis of the bore 18 through the medium of the sealing O-rings 30. It is, however, not necessary to depend upon the O-rings for this purpose because, if desired, a portion of the piston intermediate the O-rings may be formed with splines or fingers in sliding contact with the internal surface of the cylinder. It will be observed that the splines and fingers will provide surface flow passageways on the external surface of the piston and between the piston and the internal surface of the cylinder. Obviously the splines or fingers must terminate sufficiently short of the sealing members, that is the O-rings 30, to enable the piston to experience the desired axial motion.

As illustrated in FIGS. 1 through 4, it is the tubular spaces 34, 36 (at the left half and right half of the piston respectively) that function as surface flow passageways between the opposed surfaces of the piston and the cylinder.

Further pursuant to my invention, I provide opposed annular grooves in both the piston and the cylinder. In particular, the piston is formed with an external annular groove 38 and the cylinder is formed with an internal annular groove 40. Both of these grooves are situated in planes that are perpendicular to the longitudinal axis of the cylinder and the piston and, hence, perpendicular to the direction of relative axial movement of the piston and cylinder. In the valve 10 shown in FIG. 1, the grooves are positioned midway between the sealing O-rings 30. However this position is not critical, although of course they must be intermediate the sealing rings. The grooves may be of equal width as shown in FIGS. 1 through 4 but this too, as soon will be seen, is not essential to the operation of my invention. It is necessary that the grooves be opposed to one another. In other words the open mouths of the grooves must face one another and at least portions of the grooves must be in registry.

Another essential element of my invention resides in the placement of a control member 42 in such position that it is received within both opposed grooves 38, 40 and spans the space between the open mouths thereof. Inasmuch as the opposed grooves in the embodiment of my invention being described are of annular configuration, the control member 42 necessarily is annular and preferably constitutes an O-ring, for example one of circular section. This particular section is not critical, for example an O-ring of rectangular section will function satisfactorily as a control member. The control O-ring 42 is so dimensioned that in the particular example being described it fills the mouths of both grooves. The fit of the control O-ring in the mouths of the said grooves is a snug sealing fit so that when said O-ring thus fills the mouths of both grooves, with the valve in "OFF" position fluid cannot pass the control O-ring 42 at the mouth of either of the grooves. Preferably the control O-ring 42 is bottomed against the base of at least one of the grooves here shown as the piston groove 38. This groove has been selected, as soon will be seen, because fluid under pressure, during the use of the valve 10 to be described, is present on the radially outer perimeter of the O-ring and tends to constrict the O-ring. Bottoming of the control O-ring 42 in the piston groove limits such constricting movement.

The control member in this example of my invention is elastomeric, i.e. it will yield upon the application of pressure and resume its shape when pressure is removed. It may be made of natural or synthetic rubber, leather, Teflon, nylon, etc. In general, harder materials may be desired when higher fluid pressures are to be controlled. The material of the control member also may be metallic, e.g. steel; and in such event the mouths of the piston and cylinder grooves will be wider than the control member.

Figure 2:
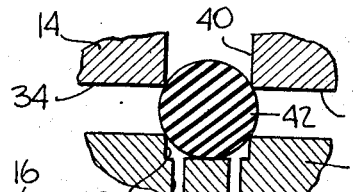
FIG. 2 is a highly enlarged sectional view of the essential control elements of the device, the same being shown in "OFF" position.

Two surface flow passageways already have been mentioned, these constituting the surface flow passageways 34, 36 at the left-hand and right-hand sides, respectively, of the elastomeric control member 42. Each of these surface flow passageways runs from between the mouths of the piston and cylinder grooves 38, 40, the surface flow passageway 34 running leftwardly only from the left-hand sides of said mouths and the surface flow passageway 36 running rightwardly only from the right-hand sides of said mouths. In idle position of the valve 10 as shown in FIGS. 1 and 2, this being the "OFF" position thereof, the two surface flow passageways 34, 36 are isolated from one another by the elastomeric member 42 which seals the inner terminals of said passageways.

However, since this is a four-way valve, two more flow passageways are necessary. These last two flow passageways are body flow passageways, one being situated in the cylinder and the other in the piston and both being arranged to individually connect the different opposed annular grooves 38, 40 to the exterior of the valve. In particular, I provide a first body flow passageway 44 which runs from the base of the cylinder groove 40 to the exterior of the cylinder. The outer terminal of this passageway may be tapped for the reception of a threaded conduit. I also provide a second body flow passageway 46, or more specifically two pairs of second body flow passageways 46, located in the piston 14. Each such second body flow passageway constitutes a slot running from a segment of the base of the piston groove 38 to the central bore 26 of the piston. The slots are, as shown, provided in pairs, one slot of each pair being located adjacent one inner corner of the piston groove and the other slot of the pair being located adjacent the other inner corner of the piston groove. Thus the two slots of each pair are disposed on opposite sides of the line of contact between the radially inner periphery of the elastomeric control member 42 and the base of the piston groove 38.

For connection to any mechanism with which the valve is to be used it is necessary to have available terminals for the tubular surface flow passageways 34, 36 and to this end I include in the cylinder 12 a first port 48 and a second port 50. The first port 48 runs from the surface flow passageway 34 to the exterior of the cylinder and the second port 50 runs from the surface flow passageway 36 to the exterior of the cylinder. The outer terminal portions of each of the ports may be tapped to facilitate connection to threaded conduits.

A typical mechanism adapted to be regulated by the valve 10 is one having two utilization spaces which are adapted to be alternately connected to two sources of fluid. Usually the two sources of fluid are at different pressures; typically one is a high pressure source and the other is an exhaust or low pressure reservoir. For proper operation of such a mechanism during one portion of the cycle high pressure fluid will be supplied to one utilization space while the other utilization space is connected to exhaust or a low pressure reservoir; and during a subsequent portion of the cycle said other utilization space will be connected to high pressure while said one utilization space will be connected to said exhaust or the low pressure reservoir. In order for the four-way valve 10 to perform such functions the two surface flow passageways are connected either to the set of different utilization spaces or to the set of different sources of fluid and the two body flow passageways are connected to the other set of the utilization spaces and the sources of fluid.

The particular valve 10 here shown is best suited for use with the second body flow passageway 46 connected to the atmosphere as an exhaust reservoir inasmuch as the opening 25 runs directly to the atmosphere as does the bore 26 (it will be understood this particular connection to the atmosphere is not the necessary connection for the valve 10); the first body flow passageway 44 connected to a source of compressed air; and the surface flow passageways connected through their ports 48, 50 to the two utilization spaces of a mechanism, e.g. the opposite ends of a pneumatic cylinder in which a piston is reciprocable.

Figure 3:
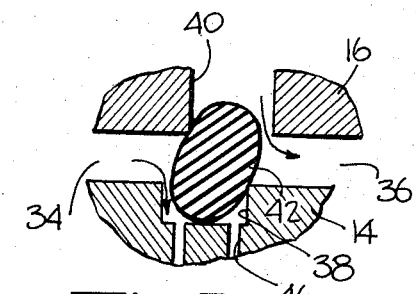
FIG. 3 is a view similar to FIG. 2, but showing the control elements arranged to connect a first source of fluid to a first utilization space and a second source of fluid to a second utilization space.
Figure 4:
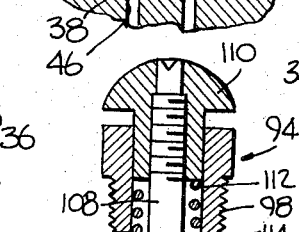
FIG. 4 is a view similar to FIG. 3, but showing the control elements arranged to connect the first source of fluid to the second utilization space and the second source of fluid to the first utilization space.
Figure 4:
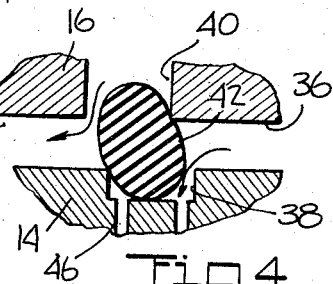

The operation of the four-way valve can best be followed by reference to FIGS. 2, 3 and 4. FIG. 2 shows the valve in its "OFF" position; FIG. 3 shows the valve with compressed air connected to one of the utilization spaces and the other utilization space connected to atmospheric exhaust; and FIG. 4 shows the valve with the said other utilization space connected to compressed air and the said one utilization space connected to atmospheric exhaust. With the valve parts disposed as shown in FIG. 2 (the piston centered), the elastomeric control member 42 blocks flow of compressed air from the body flow passageway 44 through the mouth of the cylinder groove 40. Thus the compressed air is isolated. The elastomeric control member 42 also blocks flow of air to or from the ambient atmosphere through the body flow passageway 46 and the mouth of the piston groove 38. Hence the atmospheric exhaust is isolated from the utilization spaces and from the compressed air.

The foregoing blockings are accomplished by virtue of the fact that the elastomeric control member at this time completely fills and seals the mouths of both grooves 38, 40. At the same time, the elastomeric control member seals off the inner terminal of the surface flow passageway 34 and the inner terminal of the surface flow passageway 36, these terminals being located at opposite sides of both mouths of the piston and cylinder grooves 38, 40. Therefore the elastomeric control member seals off all connections from the valve 10 to the two utilization spaces. In short, when the valve is in "OFF" position, the elastomeric control member isolates each of the flow passageways from every other flow passageway.

When the piston is shifted to its left hand extreme position as shown in FIG. 3, the upper (as seen in FIG. 3) right hand corner of the piston groove 38 presses against the lower right hand quadrant of the elastomeric control member 42 and the lower left hand corner of the cylinder groove 40 presses against the upper left hand quadrant of the elastomeric control member 42. Since these two diagonally opposite corners of the grooves 38, 40 are closer to one another in their FIG. 3 position than in their FIG. 2 position, they will squeeze the elastomeric control member 42 in a diagonal direction as considered in section.

Due to the squeezing action of the upper right hand corner of the piston groove and the ensuing deformation of the elastomeric control member 42, a space will be opened up between the lower right hand corner of the cylinder groove 40 and the upper right hand quadrant of the elastomeric control member. This space will connect the cylinder groove 40 and hence the high pressure body flow passageway 44 with the right hand surface flow passageway 36 whereby compressed air will be admitted to the utilization space that is connected to the port 50. Concurrently, due to the squeezing action of the lower left hand corner of the cylinder groove 40 and the ensuing deformation of the elastomeric control member 42, a space will be opened up between the upper left hand corner of the piston groove 38 and the lower left hand quadrant of the elastomeric control member. This space will connect the piston groove 38 and hence the exhaust body flow passageway 46 with the left hand surface flow passageway 34 whereby the utilization space which is connected to the port 48 has its pressure reduced to exhaust pressure, i.e. the pressure of the ambient atmosphere (disregarding pressure drops through the conduits and valves). The aforesaid spaces that are opened up by diagonal squeezing of the elastomeric control member have been grossly exaggerated in FIG. 3 for the purpose of illustration. The arrows extending through said spaces indicate the direction of flow of air in the indicated posture of the valve.

It is observed in passing that in the FIG. 3 posture the right hand slots 46 are blocked off and the left hand slots provide the necessary access to exhaust.

In working examples of this form of my invention the degree of movement of the piston which will effectuate the change of the valve from "OFF" condition to the left hand condition of FIG. 3 can be quite small, for example, in the order of 0.01 inch.

In FIG. 4 I have shown the piston 14 shifted to its extreme right hand position in which the compressed air now is solely connected by the oppositely diagonally squeezed elastomeric control member 42 from the body flow passageway 44 and the cylinder groove 40 to the left hand surface flow passageway 34 rather than to the right hand surface flow passageway 36 as was the case in the left hand position of FIG. 3. Similarly, the right hand surface flow passageway 36 now is solely connected by the oppositely diagonally squeezed elastomeric control member 42 to the atmosphere, i.e. to exhaust, through the piston groove 38. The arrows in FIG. 4 indicate this reversed direction of flow.

It will be readily apparent, as mentioned before, that the exhaust and compressed air connections may be made to the ports 48, 50 and that the utilization spaces may be connected to the body flow passageways 44, 46. Furthermore, oil under pressure and a low pressure oil reservoir can be substituted for the compressed air and atmospheric exhaust.

The total, i.e. overall, throw of the piston between its two extreme positions shown in FIGS. 3 and 4 can be quite small, for example, in the order of 0.02 inch.

The piston will be held in any operated position against the restoring force of the squeezed and temporarily deformed elastomeric control member 42 by the restraining frictional forces exerted on the piston by the sealing O-rings 30.

It will be appreciated from the foregoing description of this simple four-way valve 10 embodying the present invention that such devices are compact and can be operated by the application of a comparatively small force. It will also be seen that the devices are quite rugged and will provide fast and snappy action.

It also will be readily understood that the construction can be altered easily to provide a three-way valve or a two-way (through flow valve). The device can be transformed into a three-way valve by omitting either one of the surface flow passageways or either one of the ports therefore, or by eliminating either one of the body flow passageways. For example, if the body flow passageway 46 is closed the device can selectively connect a high pressure source of fluid to either of the two ports 48, 50 upon manipulation of the piston. Similarly, if the port 48 is closed, a high pressure source of fluid can be selectively connected from the port 50 to either of the body flow passageways 44, 46. By closing the port 48 and the body flow passageway 46 the device will operate as a through flow valve between the body flow passageway 44 and the port 50. Other arrangements are quite obvious and therefore will not be described.

Figure 5:
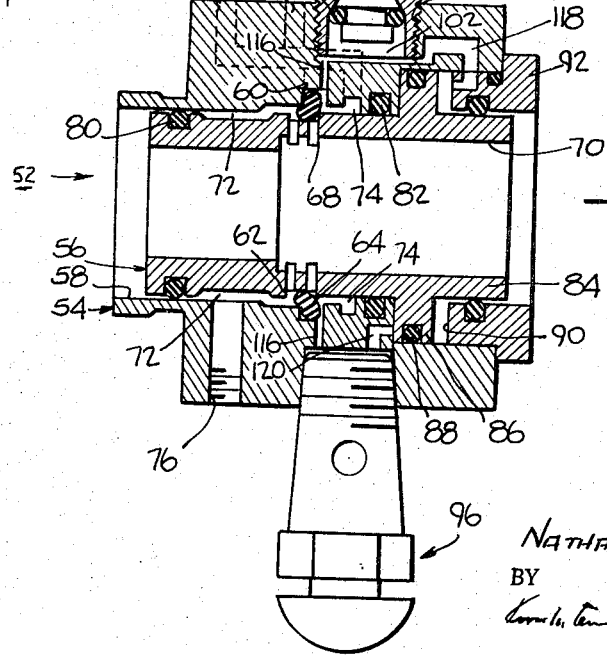
FIG. 5 is an axial sectional view of a four-way valve incorporating a fluid flow control device in accordance with the present invention and regulated by a pneumatic operator.

As indicated above, the device 10 will operate satisfactorily as a valve or the like even when the elastomeric control member 42 does not completely fill the mouths of one or both grooves in the cylinder and piston, and, even if the control member is not elastomeric and does not fill the mouths of both grooves, although under such conditions the device will be able to function only in its two extreme positions and will not provide a satisfactory "OFF" condition. A device of this latter nature in which the control member is elastomeric and does not completely fill the mouth of the piston groove is illustrated in FIG. 5. This device is further characterized by the provisions of a power means for shifting the piston with respect to the cylinder. In the device of FIGS. 1 through 4, no means was shown for shifting the piston 14. This shifting can of course be effected by hand or with the aid of power, for instance by pneumatic means or hydraulic means or by a solenoid or by a motor. In FIG. 5 one such power means, to wit, a pneumatic means, has been illustrated for the aforesaid shifting of the piston.

More particularly, in FIG. 5 I have shown and now will describe a four-way valve 52 which includes a cylinder 54 and a piston 56 slidable in the cylinder bore 58. The cylinder includes an internal annular groove 60, and the piston includes an external annular groove 62. These grooves are opposed to one another and receive an elastomeric control member 64, to wit, an O-ring. The control O-ring is received in both grooves and extends from the mouth of one groove into the mouth of the other groove across the tubular space between the cylinder bore and the external surface of the piston. The cross-section of the control O-ring is of such size that the O-ring completely fills the mouth of the cylinder groove 60. However the width of the mouth of the piston groove exceeds the width of the mouth of the cylinder groove. Hence the control O-ring does not completely fill the mouth of the piston groove.

A body flow passageway 66 runs from the exterior of the cylinder to the base of the cylinder groove 60. Plural body flow passageways 68 in the form of slots run from the bore 70 of the piston to the base of the piston groove 62. The bore 70 is exposed to the ambient atmosphere. The plural body flow passageways 68 are located adjacent the opposite base corners of the piston groove 62, there being one set of such slots adjacent the left hand base corner and another set of such slots adjacent the right hand base corner. A solid portion of the piston separates the left and right hand slots. The control O-ring is dimensioned to bear against the base of the piston groove 62.

The piston and cylinder are dimensioned to provide surface flow passageways 72, 74 to the left and right respectively of the elastomeric control member 64 between the external surface of the piston and the internal surface of the cylinder. A port 76 within the cylinder connects the left hand surface flow passageway 72 to the exterior of the cylinder and another port 78 within the cylinder connects the right hand surface flow passageway 74 to the exterior of the cylinder. The ports 76, 78 and the body flow passageway 66 may have their outer terminals tapped for convenience of connection.

Assuming that compressed air is connected to the body flow passageway 66, that the bore 70 is, as shown, connected to the ambient atmosphere and that the ports 76, 78 are connected to utilization spaces, the device operates as a four-way valve in essentially the same manner as has been described in detail with respect to FIG. 1.

The four-way valve 52 is shown with the piston 56 in its extreme left hand position so that the groove 60 is connected by a space opened around the squeezed elastomeric control member 64 to the surface flow passageway 74 (and the port 78) and so that the surface flow passageway 72 (and the port 76) is connected to exhaust through the piston groove 68 and the space opened around the diagonally opposite side of the squeezed elastomeric control member 64. It will be observed that at this time flow to exhaust takes place through the left hand base slots 68, the right hand base slots being blocked by the elastomeric control member.

When the piston is shifted to its extreme right hand position the elastomeric control member will be oppositely squeezed and the exhaust will be connected to the body flow passageway 74 through the slots at the right hand base corner of the piston groove 68. At the same time the cylinder groove 60 will be connected to the left hand surface flow passageway 72 (and the port 76).

It will be seen from inspection of FIG. 5 and the foregoing description that the valve 52 operates quite satisfactorily with the overly wide piston groove 62 although this does require a more extensive movement of the piston between its two extreme axial positions and there is no "OFF" position in which all passageways are mutually isolated.

The outer ends of the tubular surface flow passageways are blocked by sealing O-rings 80, 82, the sealing O-ring 80 being received in a groove in the piston and bearing against the cylinder bore 58 while the sealing O-ring 82 is received in a groove in the cylinder and bears against the piston.

As indicated above, the four-way valve 52 includes pneumatic means for operating the piston 56, i.e. shifting it between its extreme left and right hand positions. Said means comprises a right hand piston extension 84 on the external surface of which is provided an outwardly extending piston flange 86. The piston flange is externally grooved to accommodate sealing O-ring 88 which slidably bears against the internal surface of an enlarged pocket bore 90 formed in the cylinder 54 in axial alignment with the bore 58. The outer end of the bore 90 is closed by a centrally apertured gland 92 which is suitably sealed for sliding movement against the external surface of the piston extension 84 and which also is fixedly sealed to the cylinder 54. It will be apparent that when the pressure on one side of the piston flange 86 exceeds that on the other side of the piston flange the piston will be moved in the direction of the low pressure.

To effect change of pressure on opopsite sides of the piston flange 86, I provide a pair of tappet valves 94, 96. Actuation of the valve 94 moves the piston from left to right. Actuation of the tappet valve 96 moves the piston from right to left.

The constructions of both tappet valves are identical and hence only that of the valve 94 will be described. Inasmuch as the valves are conventional, the description will be quite brief. The tappet valve 94, comprises a housing 98 which is externally threaded for reception in a cylinder socket 100. The bottom of the valve 94 includes an outwardly opening well 102. The base end of the well forms a conical seat which when the valve is closed has presed against it an O-ring 104 carried at the head 106 of a valve stem 108 that is mounted for slidable movement within the housing 98. The outer end of the valve stem is formed with a mushrom tappet head 110 against which pressure is applied when it is desired to actuate (open) the valve 94. A spring 112 biases the valve stem outwardly to a closed position in which the O-ring 104 is pressed against the seat at the base of the well 102. Large ports 114 in the casing connect the interior of the casing around the valve stem to the ambient atmosphere.

When the tappet head is depressed the ambient atmosphere is connected from the large ports 114 around the O-ring 104 to the well 102 and socket 100 so that the well and socket at this time will quickly drop to atmospheric pressure.

Each socket 100 for each of the two tappet valves 94, 96, and hence the wells of each two valves, are connected by restricted flow passageways 116 to the base of the cylinder groove 60. Hence as to each tappet valve, as long as such valve is closed, the well 102 thereof will be at high pressure; but when the tappet valve is operated, as by depressing its head, this well will be connected to the ambient atmosphere, i.e. low pressure, through large flow passageways 114. This will drain off the pressure in the well faster than it can be replenished from the high source of pressure so that the pressure in the socket will drop as soon as the tappet valve is opened.

The socket for the left-to-right tappet valve 94 is connected by a passageway 118 to the right hand side of the bore 90. The socket for the right-to-left tappet valve 96 is connected by a passageway 120 to the left hand side of the bore 90.

When the tappet valve 94 has its head depressed the pressure of the air on the right hand side of the piston flange 86 will abruptly drop. However the pressure on the left hand side of the piston flange remains high. Therefore the flange and the piston 56 will shift from left to right. Conversely, when the tappet valve 96 has its head depressed the piston 56 will shift from right to left. When either tappet valve is released the piston will remain in its last position since equally high pressures are on both sides of the piston flange 86. The frictional restraint provided by the sealing O-rings 80, 82, 88 will serve to hold the piston against accidental shifting and against the restoring force exerted by the squeezed elastomeric control member 64.

In FIG. 6 I have shown a vibrator 122 which constitutes a mechanism that embodies a device according to my invention. In this vibrator the principle of my novel four-way valve is employed. However said valve specifically is integrated into a vibrator motor.

The vibrator motor 122 includes a cylinder 124 having a central bore 126. At one end the bore has a reduced diameter section 128 which runs through one end wall of the cylinder. At its other wide end the bore is threaded to receive a closure plug 130. The inner end of the plug is sealed by a fixed O-ring 132.

A piston 134 is mounted to slide axially within the bore 126. The diameter of the pistion is that the piston has a snug sliding fit in the bore. However the periphery of the piston is formed with axial slots to provide the surface flow passageways soon to be discussed. One end of the piston includes a stub shaft 138 that extends through the reduced diameter section 128 of the cylinder bore. A sealing O-ring 140 received in an annular groove in the section 128 provides a sliding fit between said section 128 and the stub shaft 138.

The internal surface of the cylinder is fashioned with an annular groove 142 and the external surface of the piston is fashioned with a similar groove 144. An elastomeric control member, to wit, an O-ring 146 is received within both of the opposed grooves 142, 144. The control O-ring may completely fill the mouths of both grooves and extends across the anular space between said mouths. The left hand halves of the axial slots on the surface of the piston constitue the left hand surface flow passageways 148. The right hand halves of said slots constitute the right hand surface flow passageways 150. The slots are circumferentially relieved (cut away) adjacent the elastomeric control O-rig 146. The piston is sufficiently short to permit it to move axially so as to disalign the opposed grooves 142, 144 either towards the right or towards the left.

A body flow passageway 152 runs through the stub shaft 138 into the piston 134 where it branches out through radial body flow sections 154 to the base of the piston groove 144. Fluid under pressure, e.g. air, from a suitable source thereof is connected to the body flow passageway 152 through a flexible conduit 156. To aid in controlling the motor speed and impact force of the vibrator a simple control valve 158 is interposed in the conduit 156.

Body flow passageways 160, 160' run through the cylinder from the opposite base corners of the cylinder groove 142 to a low source of pressure, for instance, to the ambient atmosphere. For refinement of regulation, simple control valves 162 and 162' are inserted in the conduits 164, 164' leading from the outer terminals of the body flow passageways 160, 160' to the atmosphere.

In operation of the vibrator 122, the supply valve 158 is opened to allow high pressure air to flow into the piston groove 144. At this time, i.e. as the vibrator is started, either the piston 134 is not exactly centered or the piston is tapped or there is leakage of high pressure air which is larger to one side of the elastomeric control member 146 than to the other. In any one of these cases the high pressure air will enter one or the other of the surface flow passageways 148, 150 and will pass therefrom to the utilization space over the associated end of the piston while at the same time the utilization space over the opposite end of the piston will be connected to one of the exhaust body flow passageways 160, 160'. The presence of the high pressure air is one of the utilization spaces and the presence of low pressure air in the other utilization space will cause the piston to be driven toward the low pressure utilization space.

As the piston crosses mid-position it will reverse the four-way valve by squeezing the elastomeric control member in the opposite diagonal direction thereby to admit high pressure air to the utilization space which is still contracting and low pressure air to the utilization space which is still expanding. This will check motion of the piston and then reverse it. Such to-and-fro motion will continue constantly and achieve a high frequency vibration.

By varying the settings of the two outflow control valves 162, 162' one may regulate the frequency of vibration and also vary the differential between the oppositely directed vibrational force, that is to say, a greater vibrational force may be obtained either to the left or to the right by suitably changing the settings of the valves 162, 162'.

It is appropriate to mention at this point that the differential control of exhaust back pressure from the two utilization spaces can be obtained in other manners; for instance, in the form of the invention shown in FIG. 1 the exhaust slots 46 at the opposite base corners of the piston groove 38 can be variably throttled by the ends of tubular sleeves adjustably mounted within the central piston bore 26 so that their tips protrude a selected distance over (to an adjustable degree) the slots 46.

In FIG. 7 I have shown another embodiment of my invention, to wit, a pressure regulator 166. Said regulator constitutes one form of a through flow valve which has been mentioned earlier in the description. However this particular through flow valve is self-regulated as to downstream pressure. The regulator 166 comprises a cylinder 168 having a central bore 170 with a reduced diameter coaxial section 172 that is tapped to threadedly receive an adjusting screw 174. The opposite open wide end of the bore is tapped to receive a threaded closure plug 176 that is sealed to the cylinder by a fixed O-ring 178. Located within the bore 170 of the cylinder is a piston 180 the length of which is shorter than the length of the cylinder bore so as to permit axial movement of the piston.

The diameter of the piston is less than the diameter of the bore to provide radial clearance therebetween for the purpose already described. The piston is supported for slidable movement in the cylinder by a sealing O-ring 182 received in a groove in the piston at one end thereof and by an annular series of radial stub fingers 184 adjacent the other end thereof. The sealing O-ring and the fingers slidably bear against the surface of the bore 170.

The cylinder is provided with an annular groove 186 and the piston with an annular groove 188, these grooves being opposed and the mouths thereof being spaced apart by the radial clearance between the piston and the cylinder.

An elastomeric control member 190 is situated in both grooves 186, 188 and bridges the radial clearance between the grooves. A passageway 192 connects the exterior of the cylinder to the radial space 194 between the sealing O-ring 182 and the elastomeric control member 190. In the use of the device 166 as a pressure regulator, an elastic fluid under pressure, such as compressed air, is supplied to the outer terminal of the passageway 192 and will permeate the radial space 194. A body flow passageway 196 through the piston connects the radial space 194 to the base of the piston groove 188. The radial space to the left of the elastomeric control member 190 constitutes a surface flow passageway 198 which leads to the space 200 at the left hand side of the piston. Said space 200 is connected to the exterior of the cylinder by a tapped passageway 202. A conduit 204 is threaded in this last named passageway.

The piston is urged toward the space 200 of a helical compression spring 206 one end of which is seated in a well 208 in the adjusting screw 174 and the other end of which is seated in a well 210 at the right hand end of the piston 180. The force exerted by the spring against the piston can be changed by varying the axial position of the adjusting screw 174. Said screw is secured in any adjusted position by a lock nut 212.

In the operation of the device 166, high pressure fluid entering through the passageway 192 passes through the radial space 194 into the body flow passageway 196 and then to the piston groove 188. The spring 206 urges the piston to the left so as to squeeze the elastomeric control member between the outer right hand corner of the piston groove 188 and the outer left hand corner of the cylinder groove 186. This creates a small annular opening between the elastomeric control member and the outer left hand corner of the piston groove 188 through which the high pressure fluid is throttled. The fluid at reduced pressure enters the surface flow passageway 198. From here the throttled fluid at reduced pressure enters the space 200 and leaves the regulator through the passageway 202 and conduit 204. When the pressure of the fluid downstream of the elastomeric control member becomes too high it tends to shift the piston to the right against the action of the spring 206 and reduces the annular throttle opening for any given compression force acting on the spring 206 by virtue of the setting of the screw 174. When the downstream pressure drops the piston will shift to the left to increase the annular throttle opening and thereby raise such pressure. Thus an equilibrium will be reached for any setting of the screw 174.

When no fluid is drawn off downstream through a utilization device the pressure momentarily builds up on the left hand side of the piston causing the piston to shift to the right a distance sufficient to squeeze the elastomeric control member between the outer right hand corner of the cylinder groove 186 and the outer left hand corner of the piston groove 188. This causes the regulator to close down, i.e. shuts off the body flow passageway 196 from the surface flow passageway 198, and maintains the downstream pressure in the conduit 204 at slightly higher than the regulated pressure.

Thus it will be seen that I have provided devices and mechanisms which achieve the several objects of my invention, and which are well adapted to meet the condition of practical use.

As various possible embodiments might be made of the above invention, and as various changes might be made in the embodiments above set forth, it is to be understood that all matters herein described or shown in the accompanying drawings is to be interpreted as illustrative and not in a limiting sense.

Having thus described my invention, I claim as new and useful and desire to secure by Letters Patent:

1. A flow control device comprising:
   (A) a cylinder body,
   (B) a piston body axially slidable in said cylinder body;
      (1) said piston body being hollow to provide a path for flow of fluid controlled by the device,
      (2) said hollow interior being fully exposed to said fluid,
   (C) an annular space between facing portions of the piston body and the cylinder body,
   (D) an annular groove on the interior surface of the cylinder body between the ends thereof,
   (E) an annular groove on the exterior surface of the piston body between the ends thereof,
   (F) said grooves running transversely to the direction of movement to the piston body,
   (G) said grooves being parallel and opposed and having their mouths facing one another,
   (H) a control O-ring received in both grooves and spanning the space between the mouths of the grooves,
   (I) a body flow first passageway in the cylinder body leading to the groove in the cylinder body,
   (J) a pair of body flow second passageways in the piston body leading to different ends of the groove in the piston body,
   (K) a surface flow third passageway leading to the mouths of both said grooves at only one side thereof,
   (L) a surface flow fourth passageway leading to the mouths of both said grooves at only the other side thereof,
   (M) there being no structural elements within the piston body to effect any control over the flow of fluid through the passageways,
   (N) the body flow second passageway in the piston body leading from the groove in the piston body to the hollow interior of the piston body,
   (O) said piston body and said cylinder body being relatively movable between two extreme positions,
   (P) the grooves and the control member being so proportioned that
      (1) when the bodies are relatively moved in one direction to one extreme position the control member is squeezed between one diagonally opposite set of corners of the mouths of said grooves
         (a) to seal the body flow first passageway from the surface flow third passageway,
         (b) to seal the body flow second passageway from the surface flow fourth passageway,
         (c) to open a space past the control member connecting the body flow first passageway to the surface flow fourth passageway, and
         (d) to open a second space past the control member,
            (i) said second space being unconnected to the first space and
            (ii) connecting the body flow second passageway to the surface flow third passageway, and that
      (2) when the bodies are relatively moved in the opposite direction to the other extreme position the control number is squeezed between the other diagonally opposite set of corners of the mouths of said grooves
         (a) to seal the body flow first passageway from the surface flow fourth passageway,
         (b) to seal the body flow second passageway from the surface flow third passageway,
         (c) to open a space past the control member connecting the body flow first passageway to the surface flow third passageway, and
         (d) to open a second space past the control member,
            (i) this second space being unconnected to the last mentioned first space and
            (ii) connecting the body flow second passageway to the surface flow fourth passageway.

2. A fluid flow control device as set forth in claim 1 wherein the control member is elastomeric and when unstressed is fully seated in the mouth of at least one of the grooves.

3. A fluid flow control device as set forth in claim 1 wherein the control member is elastomeric and when unstressed is fully seated in the mouths of both of the grooves.

References Cited

UNITED STATES PATENTS

| | | | |
|---|---|---|---|
| 2,687,742 | 8/1954 | Huber | 137—505.38 X |
| 2,920,653 | 1/1960 | Wolff | 137—625.48 X |
| 3,043,325 | 7/1962 | Slawson | 137—625.4 X |

WILLIAM F. O'DEA, *Primary Examiner.*

H. W. WEAKLEY, *Assistant Examiner.*